(12) United States Patent
Gleichenhagen et al.

(10) Patent No.: US 6,627,023 B1
(45) Date of Patent: Sep. 30, 2003

(54) USE OF A FIXING AID

(75) Inventors: Peter Gleichenhagen, Hamburg (DE); Annemarie Müller, Hamburg (DE)

(73) Assignee: tesa AG, Hamburg (DE)

( * ) Notice: Subject to any disclaimer, the term of this patent is extended or adjusted under 35 U.S.C. 154(b) by 139 days.

(21) Appl. No.: 09/600,417

(22) Filed: Jul. 17, 2000

(30) Foreign Application Priority Data

Jul. 17, 1999 (DE) .......................................... 199 33 669
Nov. 24, 1999 (DE) .......................................... 199 56 442

(51) Int. Cl.$^7$ ............................ B65H 19/18; B32B 7/06
(52) U.S. Cl. ........................ 156/157; 156/289; 156/324; 428/352; 428/354
(58) Field of Search .................................. 156/157, 182, 156/234, 238, 241, 247, 289, 297, 301, 302, 304.1, 306.3, 306.6, 324, 324.4, 344, 291; 162/193; 226/96; 242/556.1; 428/352, 354

(56) References Cited

U.S. PATENT DOCUMENTS 5,916,651 A * 6/1999 Wienberg et al. ........... 242/556

FOREIGN PATENT DOCUMENTS

EP 941954 A1 * 9/1999 ........... B65H/19/10
GB 2 294 235 4/1996

* cited by examiner

Primary Examiner—Richard Crispino
Assistant Examiner—Sing P. Chan
(74) Attorney, Agent, or Firm—Norris McLaughlin & Marcus

(57) ABSTRACT

Use of a fixing aid on the underside of a splicing tape, where a) the splicing tape is stuck using the fixing aid to the second-from-top web of a wound reel, and b) the splicing tape is also stuck to the leading edge of the topmost web of the wound reel in such a way that at least part of the adhesively equipped upper face of the splicing tape that is situated opposite to the fixing aid is open for adhesive coupling to a high-speed web of another, unrolling reel, c) the fixing aid being stuck onto the underside of the splicing tape and comprising a backing material formed from two laminated sheetlike materials, where the lamination forms a predetermined breakage zone and the fixing aid has been made pressure-sensitively adhesive on its underside.

36 Claims, No Drawings

USE OF A FIXING AID

The invention relates to the use of specific pressure-sensitive adhesive (PSA) tapes for flying splice (flying reel change) as practised, for example, in paper converting machines or printing machines with paper webs or the like.

This technique enables splicing to be carried out on reel change without stopping the machine. In a simplified description, the reel to be newly inserted is provided at its leading edge with a pressure-sensitively adhering area which, after the reel has been accelerated to the web speed of the machine, is brought adjacent to the end of the web of the expiring reel and bonded to it, as a result of which the leading edge of the replacement reel is drawn by the expiring web into the machine. The PSA areas required are produced using pressure-sensitive adhesive tapes. In the case of flying splice, these tapes are either double-sidedly pressure-sensitively adhering tapes, with which the webs are bonded in an overlapping formation (web over web), or else, in many cases, are splicing tapes (end to end) of sufficient width which adhere pressure-sensitively on one side.

Although the principle has become established in practice for decades, its technical implementation has had to be continually adapted to the increased web speeds and web widths of the machines. Thus within three decades web speeds have been increased from approximately 600 m/min to the present-day levels of up to 2500 m/min, and machine widths from approximately 2 m to approximately 8 m nowadays. The associated, relatively high forces which act on the splices mean that, even with a somewhat reduced web speed during the splicing operation, it is necessary to improve the adhesive compositions and to prepare the splice in a carefully worked-out manner. A machine stoppage due to web breakage at such speeds and web widths is the cause of very high costs of loss (outage time and reject product during the start-up phase).

A particularly large amount of time and care in preparing the splice is required to fix the leading edge to the replacement reel. Prior to splicing, indeed, it is necessary to bring the new reel to a peripheral speed which corresponds approximately to the web speed. For this operation it is necessary for the leading edge, which carries the PSA area applied for splicing, to adhere firmly to the surface of the reel by means of fixing aids. At the high speeds, even slight fluttering of this web surface hinders full-area bonding to the expiring web, and leads to breakage. As soon as the bond has been produced, on the other hand, fixing aids must be detached in order that the leading edge can separate from the reel surface. Pressure-sensitively adhering paper labels, for example, are used as such fixing aids, these labels possessing a more or less defined tensile strength as a result of choice of the paper and/or by means of specific geometry, and being stuck onto the reel by hand, in a defined number, so that the leading edge is fixed to the underlying area of the following turn of the reel. Immediately after the splicing of the two webs, the fixing aids are torn apart by the web tension.

For reliable splice preparation, and to avoid the time-consuming and not always reliable manual fixing, pressure-sensitively adhering splicing tapes have been developed which comprise in integrated form not only the adhesive areas provided for splicing but also the fixing aid for the leading edge. Divided up in the longitudinal direction, these adhesive tapes possess on their backing material two strip-like zones, one zone being double-sidedly or single-sidedly pressure-sensitively adhering for the splicing operation and being stuck onto (in the case of double-sided pressure-sensitive adhesion) or in part under (in the case of single-sided pressure-sensitive adhesion) the leading edge of the replacement reel. The second, likewise pressure-sensitive adhesive zone, which is arranged on the adhesive tape adjacent to the first zone, at a greater or lesser distance from it, serves, by means of its adhesive area lying on the underside of the adhesive tape, for fixing to the following turn which is formed by the reel surface.

WO 95/29115 describes a splicing tape where the integrated fixing aid is fastened to the reel surface by means of a weakly adhering, reversibly adhering adhesive composition. The reversibly adhering coating is intended to ensure that during the splicing operation the fixture is detached readily and without leaving sticky residues on the reel surface. This procedure has not become established in practice, since the strength levels of the reversible bond are dependent on the nature of the type of paper to be converted and hence are not constant. Furthermore, the PSA area of the fixing aid remains uncovered on the underside of the paper web and, during the converting process, is passed over the hot drying cylinders of the paper machine, depositing sticky particles which contaminate the paper, soil the drying felts and wires, and if allowed to accumulate substantially may cause breaks by causing the web to stick to drying cylinders.

Similarly, in DE 40 33 900, web fixing is carried out with a weakly pressure-sensitively adhering section in conjunction with the splicing zone.

0 418 527 A2 describes a splicing method especially for flying reel change in a printing machine. Here, the integrated, pressure-sensitively adhering fixing aid is separated from the splice zone, following the bonding of the webs, by means of an incorporated predetermined breakage point. The predetermined breakage point used is a longitudinal perforation of the backing material in the adhesive tape between the pressure-sensitive adhesive films for the splice zone and fixing zone. An advantage with this method is that the pressure-sensitively adhering areas remain covered, after splicing, by non-adhesive substrates and, consequently, no sticky surfaces are passed through the printing machine or the like. A disadvantage, on the other hand, is the poorly defined breaking strength of the predetermined breakage point in the form of a perforation. The fluctuations in strength in this case may be considerable. Moreover, separation via the individual perforations takes place jerkily in the manner of a touch-and-close fastener. Because of the individual tensile strength peaks which occur in this case, it is possible, even with small weaknesses of the individual perforation intersections, for the entire assembly to tear prematurely in a manner of a touch-and-close fastener. For printing machines with web speeds of around approximately 800 m/min, this principle may be sufficient; with the substantially faster-running paper converting machines, improved solutions to the problem are desirable.

U.S. Pat. No. 5,702,555 describes a method of releasably securing web ends to reel surfaces, release taking place in a defined manner, using a double-sidedly pressure-sensitively adhering tape which comprises, between the pressure-sensitively adhering coatings, a readily cleavable paper backing which acts as a predetermined breakage zone. When the fixture is detached, the pressure-sensitive layers remain on the paper web, with the paper backing positioned between them cleaving more or less centrally and so breaking the bond between the leading edge and the underlying turn of the reel. In this case, the pressure-sensitive adhesive layers remain covered by the two relatively thin paper webs formed in the cleavage, so that no sticky areas are passed through the machine.

DE 196 28 317 A 1 and DE 196 32 689 A1 describe pressure-sensitive adhesive tapes constructed especially for flying splice in high-speed paper machines and comprising particularly readily cleaving paper as intermediate backing material for an integrated fixing aid of the leading edge.

WO 99/46196 describes, inter alia, a repulpable splicing tape with an integrated fixing aid, the multi-ply fixing aid comprising incorporated therein a water-soluble polymer layer in contact with a silicone or organofluorine-compound release layer as a predetermined breakage point. The cleavage force is established by way of the coating thickness and release quality of the release agents. A disadvantage with this fixing aid is the unwanted introduction of such highly active surface-active agents into the paper recycling process. Moreover, the establishment of the cleavage force in the desired narrow tolerances by means of changes in the minimum coat thicknesses of such release agents requires a high level of technological complexity.

In summary, it is evident that flying reel change in modern coating plants is a complex operation where, owing to the high speeds and large masses—in the tonne range—to be accelerated, even marginal errors or weak points in this process may lead to considerable losses. For this reason, the paper factories normally keep statistics concerning the failure rate during splicing. Accordingly, there is a need for further optimization. Essential to this is the minimization of tensile stress peaks during splicing. Consequently, instantaneous jerky acceleration forces are to be avoided as far as is possible. This is a problem in connection with the sudden detachment of the fixing aids for the leading edge during splice-forming. The separation of the fixing aids, which are required to secure the leading edge of the replacement reel against the underflow of air or flaglike detachment during rotary acceleration to web speed, using comparatively high holding forces, generates a significant tension peak in the paper web. Minimizing this peak is an object of the invention, so that 1. the splice which forms in the immediate vicinity is not unnecessarily loaded, and 2. the paper surface to which the fixing aid is attached is not torn up or torn into when the predetermined breakage point is sprung. Especially with the production of relatively thin, sensitive papers, these tension peaks must be kept as low as possible, while on the other hand the reliable fixing of the leading edge on the reel continues to necessitate relatively high strengths. Owing to these requirements, the predetermined breakage point must be designed for full function within very narrow, defined tolerances.

As described in the introduction, the production of predetermined breakage points by means of more or less readily cleavable paper whose cleavage strength is lowered essentially by means of a high proportion of short fibres and fillers is evaluated more favourably than the use of reversibly adhering pressure-sensitive adhesive coatings. A disadvantage in connection with paper cleavage in the thickness of the paper (Z direction) is that a low cleavage force is difficult to establish and cannot be defined within narrow limits. Accordingly, a narrow design of the predetermined breakage tolerances is unsuccessful. Moreover, paper containing a high proportion of filler and short fibres in order to reduce the cleavage strength in the Z direction is very brittle. This leads to a brittle, inelastic and jerky cleaving, so that predetermined breakage points of this kind do not cleave in an elastically "soft" manner and make no contribution to reducing instantaneous peak loads within the splicing operation.

DESCRIPTION OF THE INVENTION

The invention teaches the use of an improved pressure-sensitive adhesive tape for implementing flying reel change with an integrated fixing aid for the leading edge of the replacement reel, where the deficiencies described do not occur, or at least not to the same extent. Essential to this utility is the incorporation of a readily and "soft"-cleavable predetermined breakage zone with narrow breakage tolerances for detaching the fixing aid from the reel surface.

For this purpose, two webs, especially two paper webs, are laminated to one another. The lamination is performed such that it gives the desired predetermined breakage zone. This can be done, for example, by using a laminating composition which in addition to a binder comprises silicone-free additives which have a weak release action and, if required, are also elasticizing. This assembly may then be coated with pressure-sensitive adhesive composition and used as an integrated fixing aid for the treatment of a pressure-sensitive adhesive tape. A large number of embodiments are possible, and it is possible, with incorporation of release papers, to produce roll product of splicing pressure-sensitive adhesive tapes with single-sidedly pressure-sensitively adhering splice bonding zones or double-sidedly pressure-sensitively adhering splice bonding zones. The fixing aid is provided on the opposite side of the pressure-sensitive adhesive zone intended for splicing, especially as described in DE 196 28 317 A1, preferably as described in FIG. 1 therein.

In selecting appropriate laminating compositions, it should be ensured that the dried films possess no adhesive force even at relatively high temperatures, so that the areas exposed after cleavage do not contaminate machine parts or product. For use in paper machines and printing machines it is desirable for no constituents of the splicing tape to disrupt the recycling of papers. Splice zones cut out in the course of further processing may then be recycled without problems. Consequently, water-based formulations of the laminating composition, comprising customary papermaking auxiliaries, are particularly advantageous. Binders which may be used include, for example, modified starches, or binders as have long been used for wet adhesive tapes. Release agents that can be used include, for example, talc, stearyl derivatives such as Ca stearate or dispersions of polymeric release agents, such as dispersions based on copolymers of stearyl methacrylate or stearyl derivatives of maleic acid with styrene, for example. Water-soluble polyglycols, for example, may be used as elasticizing agents. In particular, aqueous preparations containing 10–90% by weight binder and 10–90% by weight release agent, plus up to 60% elasticizing agent, may be used as the laminating composition. Preferred binders used are starch derivatives, e.g. anionic potato starch, in amounts of 30–70% by weight. Release agents used are preferably talc, Ca stearate and/or release-active copolymers containing stearyl groups, in amounts of 30–80% by weight. For elastication, polypropylene glycols or polyethylene glycols have proved to be highly suitable, preferably in amounts between 0–15% by weight. The products used primarily in this case are those of relatively high molecular mass which are solid at room temperature. Further elasticating agents which may be used in particular, in relatively large proportions, are gum arabic and polymers having a similar profile of properties. The laminating composition is preferably coated onto a paper backing or the like using an applicator unit suitable for aqueous dispersions and is lined in the wet state with a second paper backing or the like, and subsequently dried. If required, the measures customary in papermaking, such as rewetting, calendering and levelling of the resultant assembly, may be employed. The film thickness of the laminating composition after drying is preferably within a range of 5–20 $g/m^2$.

A further preferred variant for producing the desired predetermined breakage zone consists in the partial, non-full-area lamination of two backing webs. For this purpose, for example, one paper web is coated with discrete areas of laminating composition by means of rotary screen printing, laminated wet with the second backing web, and dried. The spacing, diameter and film thickness of the areas are determined by the screen design. Preference is given to screens of 14–100 mesh and 7%–60% open area. The amount of dried laminating composition applied is established within the range 5–25 g/m².

Screen printing is carried out using relatively high-viscosity, pastelike, non-foaming aqueous preparations whose solids content comprises, for example, anionic potato starch. Elasticizing additions such as polypropylene glycols or polyethylene glycols and/or release agents may also be used in amounts that are compatible with the principal constituent. The cleavage force is determined not only by the amount of release agent but also by screen design and solids concentration.

In order to obtain a clean printed image without smearing, the elastic component in the flow behaviour of the aqueous preparation must be kept low so as to avoid stringing. This can be achieved, for example, by additions of talc or small amounts of very finely divided silica gel or other thickeners.

By means of differing distribution and/or size of the areas of laminating composition in the predetermined breakage zone, it is possible to establish varying cleavage forces within this zone. By this means, when the fixing aid cleaves during the splicing operation, the cleavage force can be kept low, for example, at the beginning in the edge region of the fixing zone, can increase gradually as the detachment process progresses, towards the middle, by means of an increasing density or size of points of adhesive and can fall again towards the end of cleavage by means a corresponding reduction in the adhesive dots. In this way it is possible to avoid tensile stress peaks during the splicing operation, and the cleavage forces of the fixing aids may be adjusted in a defined manner to the requirements of a wide variety of different paper grades and splice geometries.

When selecting the backing papers or films it is necessary to take account of the fact that for an undisrupted conversion process the thickness of the splice should be as low as possible. Consequently, the maximum thickness, especially paper thickness of the individual backing webs should be limited preferably to 70 g/m², and the overall thickness of the assembly for the fixing aid should not exceed a maximum of 140 g/m². In order to reduce the thickness of the assembly it is also possible to laminate a relatively thin paper web onto a thicker, wet-coated backing web. A wet-strength treatment of the paper webs used is permissible in order to avoid instances of warping but should be performed in particular in a manner which still permits sufficient repulpability under operating conditions.

If wet lamination is not possible in the case of very thin papers, it is also possible to use hot-melt adhesives, preferably repulpable materials based on polyvinylpyrrolidone and/or corresponding copolymers or hydroxypropylcellulose, blended with polar waxes, resins and release waxes such as stearic acid, for example, and, if required, with preferably water-soluble plasticizers. After one of the paper backing webs has been coated with a hot-melt adhesive of this kind, the second web is laminated on thermally. The hot-melt adhesives should as far as possible have high softening ranges above 120° C., so that on contact with hot drying cylinders in the paper machine little or no hot-melt adhesive particles ("stickies") are deposited at these areas. Since hot-melt adhesives are classified as potential contaminants in papermaking, this variant of lamination is not used with preference.

The backing web, laminated together, is subsequently provided on both sides with a shear-resistant and preferably repulpable pressure-sensitive adhesive composition in film thicknesses of preferably in each case 15–40 g/m², cut into web widths of about 100–approximately 400 mm, and wound into rolls with insertion of a double-sided release backing material, e.g. siliconized paper. The fixing aids obtained in this way can subsequently be bonded to a very wide variety of splicing tapes. In DE 196 28 317 A1, an example of this is described with a single-sidedly pressure-sensitively adhesive-coated splicing tape. Anchoring of the fixing aid on the pressure sensitive adhesive splicing tape is also possible, for example, with a fixing aid with a pressure-sensitive adhesive coating on one side only. Bonding in this case may take place, for example, with a glue coat. The splicing tapes thus equipped with the integrated fixing aid may be provided as roll product in the customary manner, for example, with release paper inserted.

The predetermined breakage zone generally becomes active in the form of adhesive fracture between the laminating composition and the laminated paper web. The release force for cleaving the predetermined breakage zone when the fixing aid is cleaved, the cleaved halves both being separated at an angle of 90° to the laminated assembly at a speed of 300 mm/min, should preferably be established within a range of 3–40, especially 5–35 cN/cm. The easier-to-cleave assemblies are intended primarily for the splicing of sensitive or lightweight papers. For special applications, of course, it is also possible to exceed the abovementioned limits.

In applications where repulpability of the splicing zone is not required, the solution to the problem can be simplified accordingly. In that case, the films used as backing materials for the integrated fixing aid may also be laminated together using, as laminating composition, hot-melt adhesives having release additives, such as, for example, release waxes based on polyvinyl stearylcarbamate or talc, etc., within blend limits as specified above. Binders in the form of aqueous dispersions based, for example, on polyacrylate or poly (butadiene-styrene) with water-miscible release additives are also suitable in that case.

The invention is illustrated below with reference to examples, without wishing to restrict it unnecessarily thereby.

BRIEF DESCRIPTION OF THE DRAWINGS

The invention will now be described in greater detail with reference to the drawing, wherein FIG. 1 represents a side view of a fixing aid according to the present ivention.

EXAMPLE 1

1.1 Polymeric release agent: styrene and N-stearyl monomaleamide are free-radically copolymerized in a molar ratio of 3/1 at 85° C. in ammoniacal aqueous medium at a pH of 9 without the addition of emulsifiers, to give a polymer dispersion having a solids content of 30% by weight.

1.2 Binder: the starch derivative Emsol K 55 from Emslandstärke GmbH is dissolved in water at 80–85° C. to give a homogeneous solution having a solids content of 25% by weight.

1.3 Elasticating agent: polyethylene glycol 10,000 from Merck.

From the constituents listed under 1.1–1.3 an aqueous preparation is mixed which contains in total 25% by weight of solids, its solids fraction comprising 50% by weight of polymeric release agent, 45% by weight of binder and 5% by weight of elasticating agent, and it being used as a laminating composition.

A paper backing 11 with a basis weight of 40 g/m², Leinekraft 40 from Hannover Papier AG, is coated with the laminating composition 12. A tissue paper 13 having a basis weight of 13 g/m² is laminated onto the wet coating. The assembly is subsequently dried at 120° C. and calendered by means of rewetting. The film thickness of the dried laminating composition is 6.8 g/m².

The assembly is subsequently coated on each side with 20 g/m² of repulpable pressure-sensitive adhesive composition (14, 15).

Testing of the cleavage force in a tensile testing machine with a cleavage rate of 300 mm/min gives a result of 25–33 cN/cm.

EXAMPLE 2

The procedure of Example 1 is repeated but with the omission of the elasticating agent and the addition of Micro-Talcum Extra from Norwegian Talc as a further release agent. The dry laminating composition comprises 5% by weight polymeric release agent, 40% by weight binder and 55% by weight micro-talc. With a laminating composition film thickness of 6.5 g/m², the resulting release force, measured by the abovementioned method, is 8–15 cN/cm.

EXAMPLE 3

An aqueous formulation comprising a solid fraction of 36% by weight, which in turn comprises 60% by weight starch (Emsol K 55 from Emsland-Stärke), 30% by weight polyethylene glycol MW 10,000 and 15% by weight stearyl-containing copolymer as described in Example 1 and 10% by weight of silica gel (Aerosil 200 from Degussa) is applied to a paper web (Leinekraft 40) by rotary screen printing using a 50-mesh screen with an open area of 20%, and, directly after coating, is laminated with an identical uncoated paper web and dried at 120° C. The dried laminating composition amount is 6.5 g/m². The assembly is subsequently given a pressure-sensitive adhesive coating as described in Example 1. The release force of the laminate (cleavage force), measured by the abovementioned method, is 38 cN/cm.

What is claimed is:

1. A method of equipping a reel for a flying reel change, flying splice, said method comprising the following steps:
   a) providing a splicing tape comprising a fixing aid on an underside of the splicing tape, wherein the fixing aid comprises a backing material comprising a lamination formed from two laminate sheet materials, the lamination forms a predetermined breakage zone, and the fixing aid is pressure-sensitively adhesive on an underside thereof; and
   b) adhering a portion of an upperside of the splicing tape to a leading edge of a topmost web of a wound reel in such a way that an unadhered portion of the upperside of the splicing tape is capable of being adhered to a web of another, unrolling reel.

2. The method according to claim 1, wherein the predetermined breakage zone can be cleaved at a release force of 3–40 cN/cm as measured at a separation of the two laminated sheet materials at an angle of 90° to the lamination with a speed of 300 mm/min.

3. The method according to claim 1, wherein the predetermined breakage zone is established by laminating the two laminated sheet materials over their entire common contact area or only in partial, discontinuous portions thereof.

4. The method according to claim 3, wherein the laminating comprises coating the sheet materials with a laminating composition over their entire common contact area or only in partial, discontinuous portions thereof using screen printing or gravure printing.

5. The method according to claim 1, wherein the sheet materials are films or paper.

6. The method according to claim 5, wherein at least one of the sheet materials is a paper having a basis weight of 10–70 g/m².

7. The method according to claim 1, wherein the lamination is established by a process comprising coating the sheet materials with a laminating composition that possesses no adhesive force in a dried state.

8. The method according to claim 1, wherein the splicing tape comprising the fixing aid is lined with a double-sidely releasing backing material and is wound into a roll.

9. The method according to claim 8, wherein the double-sidely releasing backing material is siliconized paper.

10. The method according to claim 1, wherein the fixing aid is elastic.

11. A method of equipping a reel for a flying reel change, flying splice, said method comprising the following steps:
    a) providing a splicing tape comprising a fixing aid on an underside of the splicing tape, wherein the fixing aid comprises a backing material comprising a lamination formed from two laminated sheet materials coated with a laminating composition comprising Ca stearate, talc or stearyl-carrying polymers, the lamination forms a predetermined breakage zone, and the fixing aid is pressure-sensitively adhesive on an underside thereof; and
    b) adhering a portion of an upperside of the splicing tape to a leading edge of a topmost web of a wound reel in such a way that an unadhered portion of the upperside of the splicing tape is capable of being adhered to a web of another, unrolling reel.

12. The method according to claim 11, wherein the laminating composition recyclable and other constituents of the splicing tape comprising the fixing aid do not disrupt recycling of papers.

13. The method according to claim 12, wherein all backing materials of the splicing tape comprising the fixing aid comprise paper and all adhesive compositions and laminating compositions thereof are repulpable.

14. The method according to claim 1, wherein the laminating composition comprises a binder, release-active constituents and elasticating additives.

15. The method according to claim 14, wherein the laminating composition comprises a water-based composition.

16. The method according to claim 11, wherein the laminating composition comprises:
    a) 10–90% by weight of a binder;
    b) 10–90% by weight of a release agent;
    c) optionally up to 60% by weight of an elasticating agent;
    d) up to 30% by weight of fillers; and
    e) thickeners;
all amounts by weight being based on a total weight of the laminating composition.

17. The method according to claim 16, wherein the laminating composition comprises:
a) 10–90% by weight of a binder selected from the group consisting of modified starches;
b) 10–90% by weight of a release agent selected from the group consisting of talc, stearyl derivatives and dispersions of polymeric silicone- and fluorine-free release agents; or
c) optionally up to 60% by weight of an elasticating agent selected from the group consisting of water-soluble polyglycols and gum arabic;

all amounts by weight being based on a total weight of the laminating composition.

18. The method according to claim 11, wherein the laminating composition after drying is present in a film thickness of 5–25 g/m$^2$.

19. A combination capable of effecting a flying reel change, said combination comprising:
a) a splicing tape comprising an adhesive upperside; and
b) a fixing aid on the underside of the splicing tape, wherein the fixing aid comprises a backing material comprising a lamination formed from two laminated sheet materials, the lamination forms a predetermined breakage zone, and the fixing aid is pressure-sensitively adhesive on an underside thereof.

20. The combination according to claim 19, wherein the predetermined breakage zone can be cleaved at a release force of 3–40 cN/cm as measured at a separation of the two laminated sheet materials at an angle of 90° to the lamination with a speed of 300 mm/min.

21. The combination according to claim 19, wherein the predetermined breakage zone is established by laminating the two laminated sheet materials over their entire common contact area or only in partial, discontinuous portions thereof.

22. The combination according to claim 21, wherein the laminating comprises coating the sheet materials with a laminating composition over their entire common contact area or only in partial, discontinuous portions thereof using screen printing or gravure printing.

23. The combination according to claim 19, wherein the sheet materials are films or paper.

24. The combination according to claim 23, wherein at least one of the sheet materials is a paper having a basis weight of 10–70 g/m$^2$.

25. The combination according to claim 19, wherein the lamination is established by a process comprising coating the sheet materials with a laminating composition that possesses no adhesive force in a dried state.

26. The combination according to claim 19, which is lined with a double-sidely releasing backing material and is wound into a roll.

27. The combination according to claim 26, wherein the double-sidely releasing backing material is siliconized paper.

28. The combination according to claim 19, wherein the fixing aid is elastic.

29. A combination capable of effecting a flying reel change, said combination comprising:
a) a splicing tape comprising an adhesive upperside; and
b) a fixing aid on the underside of the splicing tape, wherein the fixing aid comprises a backing material comprising a lamination formed from two laminated sheet materials coated with a laminating composition comprising Ca stearate, talc or stearyl-carrying polymers, the lamination forms a predetermined breakage zone, and the fixing aid is pressure-sensitively adhesive on an underside thereof.

30. The combination according to claim 29, wherein the laminating composition is recyclable and other constituents of the splicing tape comprising the fixing aid do not disrupt recycling of papers.

31. The combination according to claim 30, wherein all backing materials of the splicing tape comprising the fixing aid comprise paper and all adhesive compositions and laminating compositions thereof are repulpable.

32. The combination according to claim 29, wherein the laminating composition comprises a binder, release-active constituents and elasticating additives.

33. The combination according to claim 32, wherein the laminating composition comprises a water-based composition.

34. The combination according to claim 29, wherein the laminating composition comprises:
a) 10–90% by weight of a binder;
b) 10–90% by weight of a release agent;
c) optionally up to 60% by weight of an elasticating agent;
d) up to 30% by weight of fillers; and
e) thickeners;

all amounts by weight being based on a total weight of the laminating composition.

35. The combination according to claim 34, wherein the laminating composition comprises:
a) 10–90% by weight of a binder selected from the group consisting of modified starches;
b) 10–90% by weight of a release agent selected from the group consisting of talc, stearyl derivatives and dispersions of polymeric silicone- and fluorine-free release agents; or
c) optionally up to 60% by weight of all elasticating agent selected from the group consisting of water-soluble polyglycols and gum arabic;

all amounts by weight being based on a total weight of the laminatinor composition.

36. The combination according to claim 29, wherein the laminating composition after drying is present in a film thickness of 5–25 g/m$^2$.

* * * * *

UNITED STATES PATENT AND TRADEMARK OFFICE
CERTIFICATE OF CORRECTION

PATENT NO.        : 6,627,023 B1　　　　　　　　　　　　　　　　　　　　Page 1 of 1
APPLICATION NO. : 09/600417
DATED             : September 30, 2003
INVENTOR(S)       : Gleichenhagen et al.

It is certified that error appears in the above-identified patent and that said Letters Patent is hereby corrected as shown below:

Column 8, Line 45, "composition recyclable" should read -- composition is recyclable --

Column 9, Line 18, "change, said" should read -- change, flying splice, said --

Column 10, Line 4, "change, said" should read -- change, flying splice, said --

Column 10, Line 47, "all elasticating agent" should read -- an elasticating agent --

Column 10, Line 51, "laminatinor composition" should read -- laminating composition --

Signed and Sealed this

Fifth Day of June, 2007

JON W. DUDAS
*Director of the United States Patent and Trademark Office*